United States Patent [19]
Keanini et al.

[11] Patent Number: 5,981,896
[45] Date of Patent: Nov. 9, 1999

[54] APPARATUS AND METHOD FOR CREATING DRY UNDERWATER WELDS

[75] Inventors: Russell G. Keanini, Harrisburg; Michael L. Newman, Salisbury; Robert Jeffery Lowery, Charlotte; Gregory J. Frederick, Harrisburg, all of N.C.

[73] Assignee: Electric Power Research Institute, Inc., Palo Alto, Calif.

[21] Appl. No.: 09/140,165

[22] Filed: Aug. 26, 1998

[51] Int. Cl.$^6$ .................................................. B23K 9/16
[52] U.S. Cl. ........................ 219/74; 219/72; 219/137 R; 219/136; 219/121.11
[58] Field of Search ........................ 219/74, 72, 137 R, 219/136, 121.11

[56] References Cited

U.S. PATENT DOCUMENTS

| | | | |
|---|---|---|---|
| 3,632,950 | 1/1972 | Berghof | 219/72 |
| 3,671,707 | 6/1972 | Cunningham | 219/74 |
| 3,794,804 | 2/1974 | Berghof | 219/137 |
| 3,876,852 | 4/1975 | Topham | 219/72 |
| 3,905,234 | 9/1975 | Berghof | 219/72 |
| 4,035,602 | 7/1977 | Berghof | 219/723 |
| 4,052,632 | 10/1977 | Sagara et al. | 219/137 R |
| 4,139,758 | 2/1979 | Pinfold | 219/74 |
| 4,319,116 | 3/1982 | Kauppi et al. | 219/72 |
| 4,527,046 | 7/1985 | Asonen | 219/137 R |
| 4,894,512 | 1/1990 | Heusi et al. | 219/130.4 |
| 5,236,517 | 8/1993 | Findlan et al. | 148/23 |

OTHER PUBLICATIONS

"Weld Fumes in High Pressure MIG Welding", Yoji Ogawa, Jitsuo Sakakibara, Satoshi Matsuoka, (of the Government Industrial Research Institute, Shikoku, Miti, Japan) pp. 165–170, Proceedings of the 11th International Conference on Offshore Mechanics and Arctic Engineering 1992, vol. III, Part A –Materials Engineering ASME 1992

"A Rotating Two–Phase Gas/Liquid Flow Regime for Pressure Reduction in Underwater Plasma Arc Welding", Helmut Steinkamp and Dieter Mewes, pp. 81–87, Chemical Engineering Technology 17 1994 © VCH Verlagsgesellschaft mbH, D–69451 Weinhelm 0930–7516/94/ 0204–0081.

"Applicability of Underwater Wet Plasma Welding with an Attachment Developed for Horizontal Position Welding", Takeshi Fukushima, Sadao Fukushima and Junichi Kinugawa , Sep. 6, 1989, pp. 28–39, Transactions of National Research Institute For Metals, vol. 32, No. 1, 1990.

"Development of Shielding Method With Water Jet and Gas In Underwater Plasma Welding", Junichi Kinugawa , Takeshi Fukushima and Sadao Fukushima, pp. 33–43, Transactions of National Research Institute For Metals, vol. 16, No. 5, 1974.

"Study of Underwater Welding Using a Modified Gravity Technique", Leu–Wen Tsay and Chun Chen, Shen–Wang Cheng, Journal of the Chinese Institute of Engineers, vol. 15, No. 3, pp. 285–292, 1992.

(List continued on next page.)

*Primary Examiner*—Patrick Ryan
*Assistant Examiner*—M. Alexandra Elve
*Attorney, Agent, or Firm*—Flehr Hohback Test Albritton & Herbert LLP

[57] ABSTRACT

An apparatus for underwater welding has a housing and a diverter. The diverter is inside the housing and has an outer sheath and an inner sheath. A gap between the housing and diverter passes a screening fluid to form an outer screening jet that prevents water from flowing into a weld site near the electrode. The inner sheath forms a pair of channels in the inner diverter. One channel passes a shielding fluid that shields the weld site. The other channel forms an exhaust line for venting the weld site during welding.

21 Claims, 5 Drawing Sheets

OTHER PUBLICATIONS

"Fitness–For–Service Design for Underwater Wet Welds", C.L. Tsai, L.R. Zirker, Z.L. Feng, J.A. Grantham and J.C. Papritan, pp. 1–s to 8–s, Welding Research Supplement to the Welding Journal, Jan. 1994.

"Automatic and Diverless Underwater Welding: New Systems and concepts", J.F. Dos Santos, H. Manzenrieder, H. Cui, J. Recoschewitz, A. Dobernowsky, P. Szelagowski and D. Seeliger, pp. 165–175, Proceedings of the Second (1992) International Offshore and Polar Engineering Conference, San Francisco CA USA, Jun. 14–19, 1992, ISBN 1–880653–00–1, vol. IV.

"Designing Shielded Metal Arc Consumables for Underwater Wet Welding in Offshore Applications", A. Sanchez–Oslo, S. Liu, D.L. Olson, S. Ibarra, pp. 212–220, Transactions of the ASME, vol. 117, Aug. 1995.

FIG.—5

APPARATUS AND METHOD FOR CREATING DRY UNDERWATER WELDS

BRIEF DESCRIPTION OF THE INVENTION

This invention relates generally to underwater welding. More particularly, this invention relates to a technique for dry underwater welding that uses a coaxial gas-shielded weld head with an exhaust line that eliminates particulate plume and control envelope pressure oscillations.

BACKGROUND OF THE INVENTION

Underwater welding has numerous important applications in a broad range of industries, such as fabrication and repair of marine structures, pipelines, vessels, and nuclear and petrochemical facilities. The procedure can be performed in either a "dry" mode where water near the weld site is evacuated using a hyperbaric chamber, or in a "wet" mode where water is allowed to contact the weld site. While in-air quality welds can be obtained using the "dry" mode, the hyperbaric chamber is expensive and is difficult to maneuver and handle.

Typically, wet welding techniques include shielded metal arc welding, gas metal arc welding, flux cored arc welding, friction welding, explosive welding and stud welding. Other techniques include water and gas shielded gas tungsten arc welding, friction stitch welding, use of flexible, reduced stress weld connections, welding within rotating, pressure reducing pipes and chambers, and welding within partially open, work piece-attached chambers.

Although many wet welding techniques have been developed, significant metallurgical, mechanical and operational problems remain. In particular, relative to in-air or dry mode welds, wet welds tend to exhibit high porosity, increased hydrogen embrittlement, increased solidification cracking, reduced weld strength, and reduced weld toughness. These problems are caused by rapid cooling and entrapment of steam and hydrogen within the weld. Underwater welding typically produces hydrogen by the decomposition of water between the arc and the work piece. Rapid cooling of the weld material traps the hydrogen inside the weld. As a result, the weld is porous and embrittled by hydrogen. Moreover, during welding the work piece becomes hot, causing steam and rising hydrogen bubbles to create a region of oscillating pressure around the arc.

In addition, the rapid formation of dark, water-borne particulate plumes near the weld site poses a significant operational problem. The plumes may impair and even prevent visual inspection and monitoring of the weld.

In view of the foregoing, it would be highly desirable to provide an improved technique for underwater welding. The technique should provide an underwater weld with reduced porosity and increased solidification. In addition, the technique should work with existing welding techniques.

SUMMARY OF THE INVENTION

The invention includes an apparatus for underwater welding having a housing and a diverter. The diverter is inside the housing and has an outer sheath and an inner sheath. A gap between the housing and diverter passes a screening fluid to form an outer screening jet that prevents water from flowing into a weld site near an electrode. The inner sheath forms a pair of channels in the inner diverter. One channel passes a shielding fluid that shields the weld site. The other channel forms an exhaust line for venting the weld site during welding.

The invention provides an efficient technique for underwater welding which reduces the particulate plume and controls the envelope pressure oscillations at the weld site. This underwater welding technique results in an improved underwater weld with reduced porosity and increased solidification.

BRIEF DESCRIPTION OF THE DRAWINGS

For a better understanding of the nature of the invention, reference should be made to the following detailed description taken in conjunction with the accompanying drawings, in which.

Like reference numerals refer to corresponding parts throughout the several views of the drawings.

Detailed Description of the Invention

Figure 1:
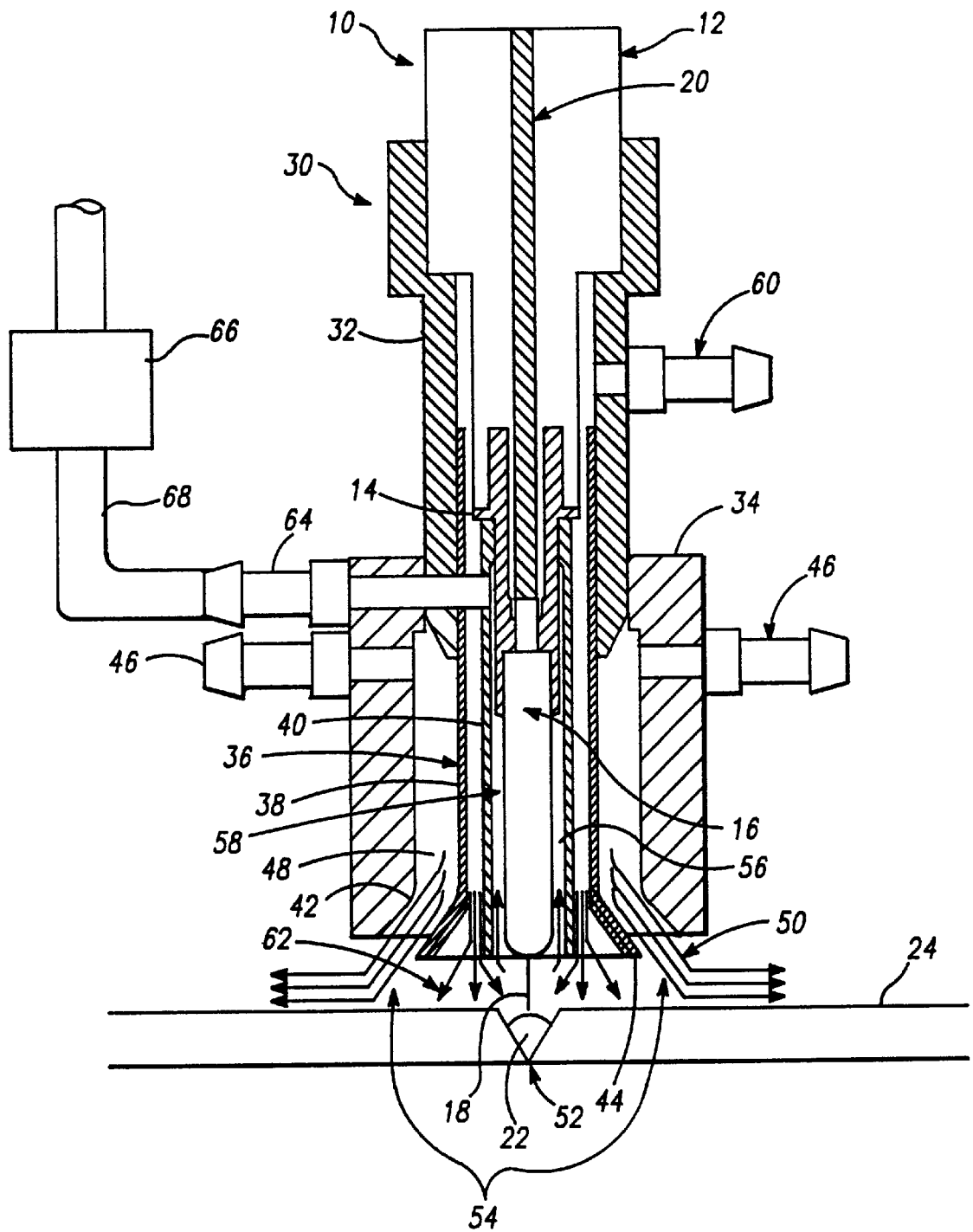
FIG. 1 is a side cross-sectional view of a first embodiment of a gas-shielded weld head with regulated exhaust in a preferred embodiment of the present invention.

FIG. 1 is a side cross-sectional view of a first embodiment of a gas-shielded weld head with a regulated exhaust in a preferred embodiment of the present invention. A welder 10, such as a gas metal arc welder, has a body 12 with supports 14 that hold an electrode 16. The supports 14 use a set screw or a press fit to support the electrode 16. A weld wire 18 is supplied to the electrode 16 through an electrically insulated wire feed liner 20. During welding, the electrode 16 contacts the weld wire 18 causing the weld wire to melt and form a weld 22 on a work piece 24.

For underwater welding, a welding head 30 is attached to the body 12 of the welder 10. The welding head 30 has a welder support 32 that engages the welder 10. The welder support 32 is attached to a housing 34 and a diverter 36 and is considered to be a part of the diverter. Both the housing 34 and the diverter 36 are cylindrical. The diverter 36 has an outer sheath 38 and an inner sheath 40. An open end 42 of the housing 34 has a beveled shape. An open end 44 of the outer sheath 38 of the diverter 36 is formed in a conical shape. The housing 34 has an inlet 46 that attaches to a supply line to supply a fluid such as air. A gap 48 is formed between the housing 34 and the outer sheath 38 of the diverter 36 for passing the fluid 50 to form an outer screening jet to prevent water from flowing into the weld site 52 near the electrode 16. In other words, the fluid jet forms a continuous curtain surrounding the weld site 52 that prevents the surrounding water from entering the weld site 52. Due to heating at the weld site 52, an envelope 54 above the weld site and encompassed by the screening jet 50, is free of liquid water. In one embodiment the curtain surrounds the outer periphery of the outer sheath 38 of the diverter 36.

The inner sheath 40 of the diverter 36 surrounds the electrode 16 and forms a pair of channels 56, 58 within the diverter 36. One channel 56 has an inlet 60 and passes a shielding fluid 62 for shielding the weld site 52 during welding. The other channel 58 has an outlet 64 and forms an exhaust line for venting the weld site 52 during welding. The inlets 46, 60 are used to attach hoses to the welding head 30 to connect to liquid and gas supplies.

The shielding fluid 62 forms an inner shield jet and typically is a gas such as argon or air. The shield gas 62 protects the weld 22 from hydrogen and steam within the evacuated region beneath the diverter 36 thereby reducing and possibly eliminating hydrogen embrittlement and weld porosity. Alternately, an inert shield gas is used when welding reactive metals such as aluminum or aluminum alloys. The inner shield jet also helps to scour remnant water from the weld site 52.

The exhaust line 58 vents the weld site 52 during welding and provides a path for pressure to bleed off. The exhaust line 58 substantially eliminates the envelope 54 pressure oscillations and reduces, and under certain circumstances eliminates, the particulate plume. Since envelope 54 pressure oscillations can promote weld pool turbulence and mass transfer of hydrogen, steam and oxygen into the weld pool, the control of envelope 54 pressure oscillations is critical.

The pair of channels 56, 58 and the gap 48 are coaxial. In other words, the housing 34, and the inner and outer sheaths, 36 and 38 respectively, of the diverter 36 are coaxial, thereby forming a coaxial exhaust line and screening jets.

A noteworthy aspect of the invention is that a regulator 66 is attached to the exhaust line 58 to further improve the weld quality. The regulator 66 helps to control envelope 54 pressure oscillations above the weld site 52 by minimizing gas bubble release through the outer screening jet 50. The regulator 66 is an external valve that is connected to the exhaust outlet 64 by a hose 68. The particulate plume and gas bubble release is monitored. The valve is adjusted either manually or automatically so that the release of particulates and gas bubbles do not significantly alter the envelope 54 pressure.

During operation, the outer screening jet 50 forms a continuous curtain of fluid about the weld site 52. The pressure associated with the outer screening jet is substantially equivalent to the pressure of the surrounding water. The pressure p of the surrounding water at the weld site is equal to:

$$p = \rho \cdot g \cdot h + P_{ATM},$$

where $\rho$ is the density of the water, g is the gravitational constant, h is the depth and $P_{ATM}$ is the ambient pressure at the water's surface. To form the continuous curtain, the fluid of the outer screening jet exerts a pressure ranging from about p to p + $\Delta$p, where $\Delta$p is on the order of one pound per square inch (psi). During operation, the regulator is adjusted such that exhaust, air, steam and inner shield gas within the envelope 54 are at an essentially fixed pressure substantially equal to the pressure of the outer screening jet. By equillibriating envelope 54 pressure with the surrounding water pressure p, it is difficult for gas bubbles to pass through the outer screening jet 50. Thus leakage of water through the screening jet 50 into the weld site is substantially eliminated. This feature is critical to achieving in-air (dry) quality welds.

Because the regulator 66 adjusts the envelope 54 pressure, the regulator 66 helps to maintain the equilibrium state of the continuous curtain of air surrounding the weld site 52. The regulator 66 also provides a convenient way to maintain the equilibrium pressure as the depth of the weld site 52 or the pressure of the outer screening jet changes.

Figure 2:
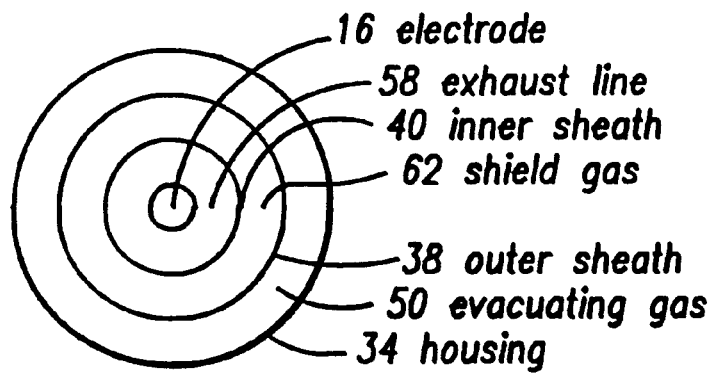
FIG. 2 is an end view of the gas shielded weld head of FIG. 1.

FIG. 2 is an end view of the gas shielded weld head 30 of FIG. 1. The electrode 16 is in the center surrounded by, in order, the exhaust line 58, inner sheath 40, shield gas channel 62, outer sheath 38, evacuating gas gap 50 and housing 34. In this configuration, the channel 58 forming the exhaust line is not completely sealed off and the exhaust leaks into the wire feed liner. However, this leaking of the exhaust line does not significantly impact performance of the weld head.

Figure 3:
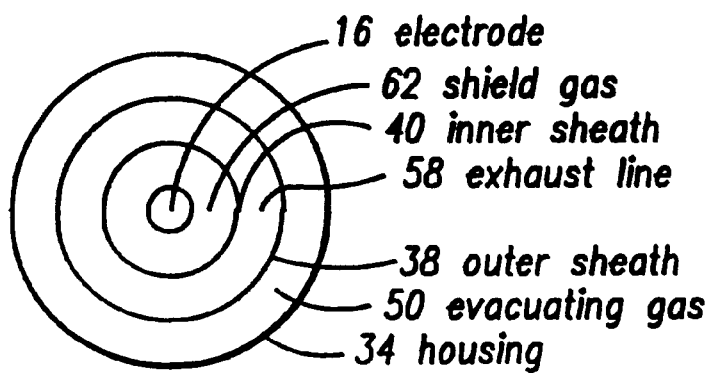
FIG. 3 is an end view of another embodiment of the gas shielded weld head of FIG. 1.

FIG. 3 is an end view of another embodiment of the gas shielded weld head 30 of FIG. 1. FIG. 3 is similar to FIG. 2 except that the positions of the exhaust line 58 and shield gas channel 62 are reversed and the exhaust line 58 does not leak.

Embodiment for Remote, Externally Controlled Underwater Welding

The preceding embodiments, shown in FIGS. 1, 2 and 3, are appropriate for hand-held underwater use. However, in applications requiring remote, externally controlled welding, an embodiment shown in FIG. 4 would be more appropriate.

Figure 4:
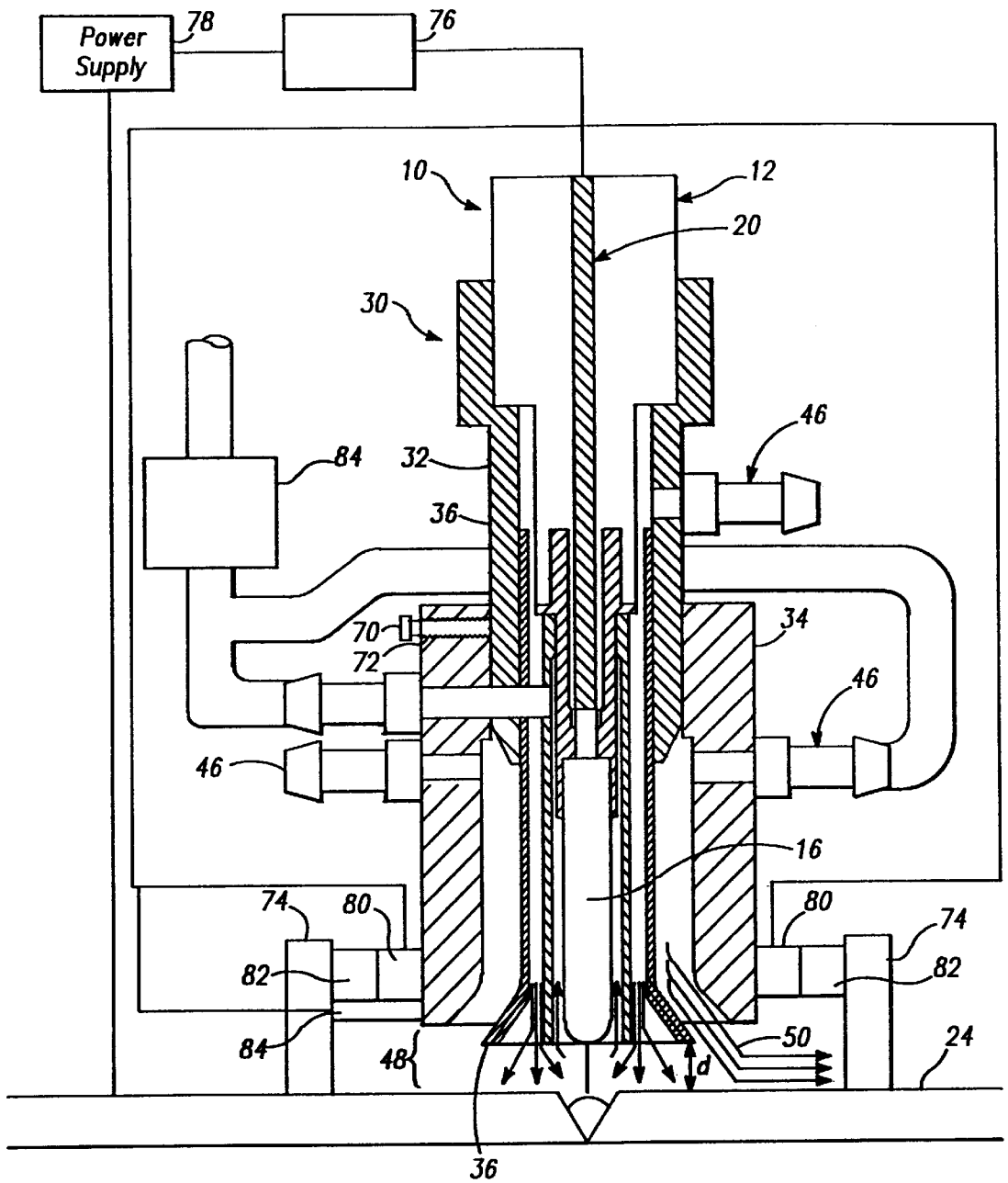
FIG. 4 is the weld head of FIG. 1 with mechanisms to adjust the housing and the standoff distance.

FIG. 4 is the weld head 30 of FIG. 1 with an adjustable diverter 36 that adjusts the diverter's position with respect to the housing 34. The housing 34 has an aperture 70. A set screw 72 screws into the aperture 70 and fixes the diverter 36 at a desired position. The set screw 72 can be loosened to adjust the position of the diverter 36. The adjustable diverter 36 allows the user to control the gap 48 thickness and therefore the thickness of the outer jet 50. The thickness of the outer jet 50 is approximately proportional to the standoff distance d from the weld surface 24.

To maintain proper shielding from ambient water and to minimize pumping requirements, the standoff distance d between the diverter 36 and the work piece 24 is minimized and stabilized. In the present embodiment, the housing 34 engages rails 74. An external controller 76 is connected in series with a power supply 78 and the electrode 16 of the welder 10. The power supply 78 also attaches to the work piece 24. The external controller 76 monitors the voltage and current of the arc from the electrode 16. Based on the voltage and current, the controller 76 causes a motor 80 to adjust a gear 82 that adjusts the position of the housing 34 with respect to the rails 74 to maintain the desired standoff distance d from the work piece 24. In particular, the automatic controller 76 may be desirable when the standoff distance is small such as one centimeter or less.

Alternately, instead of monitoring the voltage and current of the arc, a distance sensor 84 is attached to the housing 34 and supplies a signal to the controller 76. A predetermined distance is also supplied to the controller 76. In response to the signal from the distance sensor 82, the controller 76 controls the motor 78 so that the weld head 30 is positioned at the predetermined distance with respect to the work piece 24. In an alternate embodiment, the distance sensor 82 is attached to the diverter 36.

The weld head 30 can be adapted for use with various underwater welding techniques such as gas tungsten arc welding, flux cored arc welding, plasma arc welding, variable polarity plasma arc welding and gas metal arc welding.

Embodiment for Deep Underwater Welding

Since the cost of pumping air to the weld site becomes significant at depths on the order of a few hundred feet, an impeller 84 is attached to the outer gas inlets 46 to generate an outer shielding jet of ambient water. The impeller 84 is supplied with electricity in parallel to the weld electrode supply.

Embodiment for Gas Tungsten Arc Welding

Gas tungsten arc welding uses a non-consumable weld electrode and an inert gas shield. To prevent short circuiting between the tip of the electrode 16 and the diverter 36, the diverter 36 is covered with an electrically insulating material. Alternately, the diverter 36 is fabricated from a non-conducting material such as a ceramic.

Embodiment for Plasma Arc and Variable Plasma Arc Welding

Figure 5:
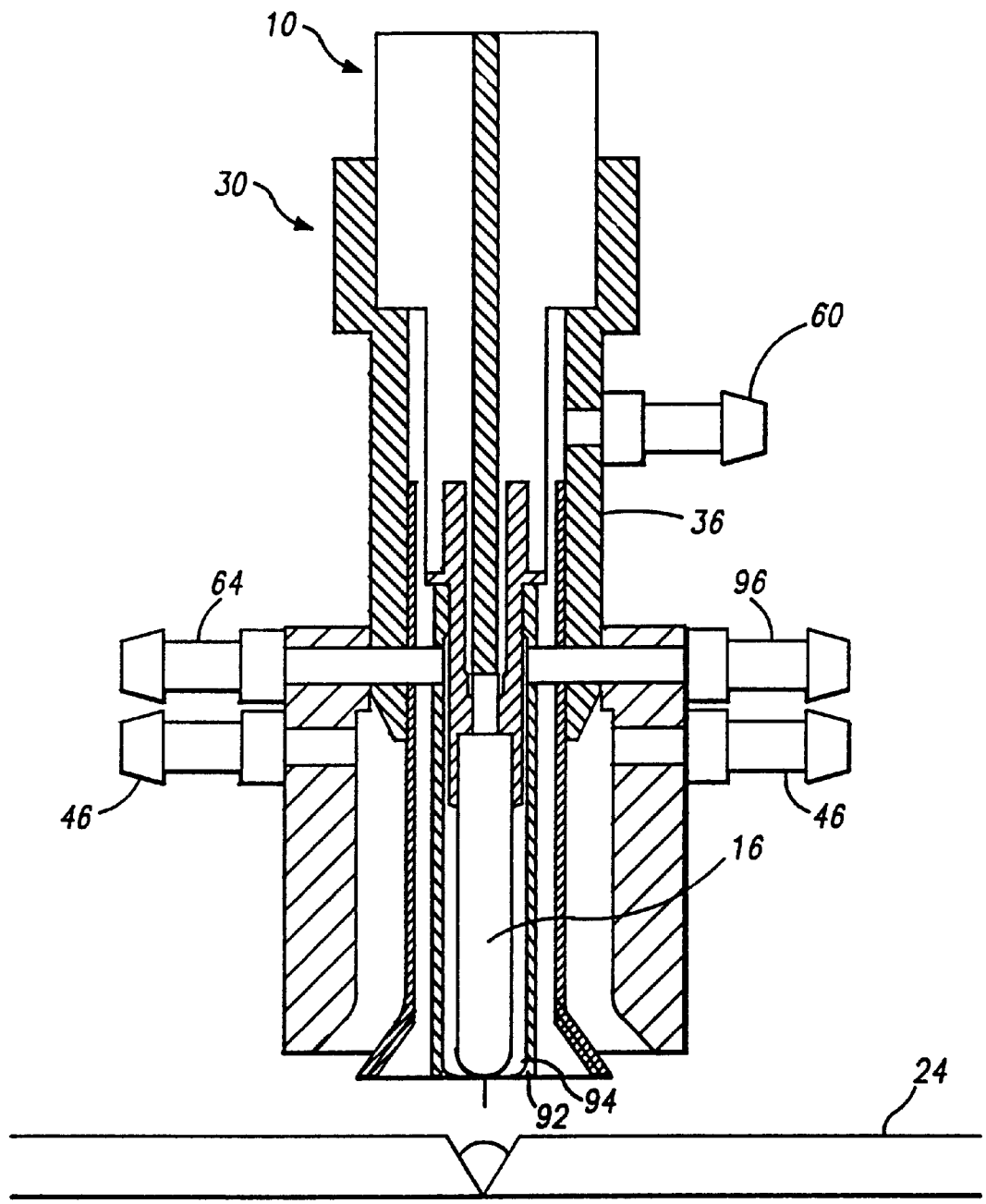
FIG. 5 is an alternate embodiment of the weld head of FIG. 1 suitable for use with plasma arc welding.

FIG. 5 is an alternate embodiment of the weld head 30 of FIG. 1 suitable for use with plasma arc and variable plasma arc welding. Plasma arc and variable plasma arc welding use a non-consumable weld electrode and an inert gas shield. The shield gas does not contact the weld electrode 16. A second stream of inert gas (orifice gas) passes by the electrode where it is heated and constricted to form a high speed plasma arc jet. Typically, plasma arc welding is performed in a direct current mode where the electrode voltage is held negative relative to the work piece. In contrast, variable plasma arc welding uses an unbalanced alternating current where the duration of positive and negative voltages are unequal during each cycle.

As shown in FIG. 5, a plasma shield 92 is added to the diverter 36 to form and provide an orifice gas channel 94 to supply the orifice gas. The plasma shield 92 is constricted near the electrode 16 tip to create the plasma jet. The plasma shield 92 acts as a second electrode to form an arc between the electrode 16 and the plasma shield 92. Orifice gas is supplied via an orifice gas inlet 96.

Similar to gas tungsten arc welding, the diverter 36 is covered with an electrically insulating material or made from a non-conductor.

Figure 6:
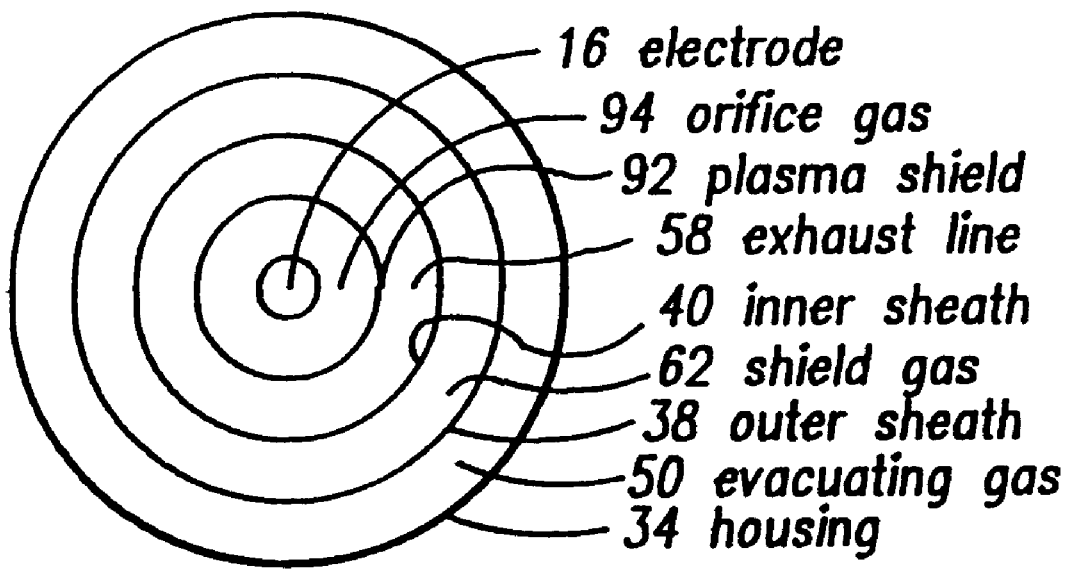
FIG. 6 is an end view of the weld head of FIG. 5.

FIG. 6 is an end view of the weld head of FIG. 5. The electrode 16 is in the center surrounded by, in order, the orifice gas channel 94, the plasma shield 92, the exhaust line 58, inner sheath 40, shield gas channel 62, outer sheath 38, evacuating gas gap 50 and housing 34. In an alternate embodiment, the shield gas channel 62 and exhaust line 58 are reversed.

Preferably the weld head is used with filler metals as described in U.S. Pat. No. 5,235,517, hereby incorporated by reference as background information on filler metals.

Extensions

The shape of the interior of the open end 42 of the housing 34 is designed to correspond to the shape of the outer sheath 38 of the diverter 36 to form the outer screening jet 50 into a desired shape such as a conical shape. In the embodiment described above, the outer screening jet 50 is conical and the open end of the diverter and housing is circular. However, housing and diverter shapes are customized to the particular application. Even though the outer sheath 38 of the diverter 36 is conical, the open end of the cone may graduate into other shapes such as a rectangle or oval. For example, in an alternate embodiment for V-groove welding, the diverter 36 has a circular shape in all but the direction of the groove. In the groove direction, the diverter is shovel shaped to force water out of the unwelded groove.

In another alternate embodiment, for fillet welding, two metal plates or components form a T-shaped joint. The diverter and housing have corresponding conical shapes graduating to an open end with a rectangular or oval shape. The longitudinal axis of the diverter is aligned with the groove direction to improve access of the weld head into the root of the fillet weld joint.

The weld head 30 has several advantages. First, the weld head 10 can be used for both autogenous and non-autogenous welding in any spacial orientation. Second, the weld head 30 can be used to weld tighter and more complex joint geometries than purge-box containers that contact the base plate and remove water to create a dry environment. Third, because the weld head 30 has no moving parts, reliability is improved and maintenance requirements are reduced. Finally, since the weld head 30 produces dry, in-air quality welds, problems associated with hydrogen embrittlement and weld porosity are reduced or even eliminated.

Those skilled in the art will recognize the numerous benefits associated with the entire apparatus of the invention. In its most basic function, the invention provides an exhaust line for venting a weld site during underwater welding. A significant feature of the invention is that the weld head has a regulated exhaust line that substantially eliminates pressure oscillations and gas bubble release through an outer screening jet. Thus, the invention allows for deep underwater welding. As a result, the use of the weldhead produces in-air quality welds with low porosity.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus for underwater welding, comprising:
   a housing; and
   a diverter, at least partially inside said housing, said diverter having an outer sheath and an inner sheath,
      a gap between said housing and diverter for passing a screening fluid to form an outer screening jet to prevent water from flowing into a weld site near an electrode, and
      said inner sheath forming a pair of channels in said inner diverter, one channel passing a shielding fluid for shielding said weld site, the other channel forming an exhaust line for venting said weld site during welding.

2. The apparatus of claim 1 further comprising:
   a regulator attached to said exhaust line for substantially eliminating pressure oscillations within said weld site.

3. The apparatus of claim 1 further comprising:
   a regulator attached to said exhaust line for substantially eliminating gas bubble release through said outer screening jet.

4. The apparatus of claim 2 wherein said regulator is a valve.

5. The apparatus of claim 3 wherein said regulator is a valve.

6. The apparatus of claim 1 wherein said diverter is adjustable.

7. The apparatus of claim 1 further comprising:
   a set screw, wherein said housing has an aperture for receiving said set screw such that said set screw contacts said diverter to fix the diverter at a desired position.

8. The apparatus of claim 1 wherein said pair of channels comprises a first channel within a second channel, said first channel forming said exhaust line and said second channel passing said shielding fluid.

9. The apparatus of claim 1 wherein said pair of channels comprises a first channel within a second channel, said first channel passing said shielding fluid, and said second channel forming said exhaust line.

10. The apparatus of claim 1 wherein said pair of channels are coaxial.

11. The apparatus of claim 1 wherein said gap and said pair of channels are coaxial.

12. The apparatus of claim 1 further comprising:

an impeller attached to said outer screening jet to increase fluid pressure of said outer screening jet.

13. The apparatus of claim 1 further comprising:

a gear engaged to said housing for maintaining said housing at a predetermined distance from a work piece;

a motor engaging said gear;

means for determining a sensed distance between said electrode and said weld site; and a controller responsive to said distance sensor and controlling said motor when said sensed distance is not equal to said predetermined distance.

14. The apparatus of claim 1 wherein said diverter is electrically insulated from said electrode.

15. The apparatus of claim 1 further comprising:

a plasma shield disposed between said electrode and said inner sheath of said diverter, forming an orifice gas channel supplying a stream of orifice gas to said electrode for forming a high speed plasma arc jet during welding.

16. A method of underwater welding, comprising the steps of:

supplying an electrode to a weld site where a work piece is to be welded; heating said electrode to effect welding of said work piece at said weld site;

providing a pair of channels around said electrode;

supplying a shield gas through one of said pair of channels to create a shield region at said weld site;

providing an exhaust line through an other one of said pair of channels, said exhaust line for venting said shield region during welding;

providing an outer channel about said pair of channels; and conducting a fluid though and out of said outer channel with sufficient force to create a boundary region about said weld site for preventing invasion of water into said boundary region.

17. The method of claim 16 further comprising the step of:

regulating said exhaust line to substantially eliminate pressure oscillations within said boundary region.

18. The method of claim 16 wherein said pair of channels has an inner channel and an outer channel, and said step of providing an exhaust line uses said inner channel as said exhaust line.

19. The method of claim 16 wherein said pair of channels has an inner channel and an outer channel, and said step of providing an exhaust line uses said outer channel as said exhaust line.

20. The method of claim 16 further comprising the steps of:

determining a distance between said electrode and said weld site; and adjusting said electrode to a predetermined position in response to said determining step.

21. The method of claim 16 further comprising the step of:

supplying a stream of orifice gas to said electrode for forming a high speed plasma arc jet.

* * * * *